United States Patent [19]

Bolstad et al.

[11] 3,887,509

[45] June 3, 1975

[54] AMMONIUM SALTS OF RESINOUS POLYCARBOXYLIC ACIDS

[75] Inventors: Richard Bolstad, Bronx, N.Y.; Anna F. Melchoni, West Paterson, N.J.

[73] Assignee: Inmont Corporation, New York, N.Y.

[22] Filed: Jan. 28, 1974

[21] Appl. No.: 437,356

Related U.S. Application Data

[63] Continuation-in-part of Ser. No. 409,482, Oct. 25, 1973, abandoned.

[52] U.S. Cl.......... 260/29.1 R; 260/78.5 T; 260/851
[51] Int. Cl. ............................................ C08f 45/26
[58] Field of Search ......... 260/29.1 R, 78.5 T, 80.1, 260/85.1, 96 R; 117/38

[56] References Cited

UNITED STATES PATENTS

| | | | |
|---|---|---|---|
| 2,607,762 | 8/1952 | Bowen | 260/78.5 |
| 2,621,169 | 12/1952 | Robinette et al. | 260/78.5 |
| 3,223,663 | 12/1965 | Altobelli et al. | 260/28.5 |
| 3,436,378 | 4/1969 | Azorlosa et al. | 260/78.5 |
| 3,657,175 | 4/1972 | Zimmerman | 260/29.4 UA X |
| 3,687,906 | 8/1972 | Hanson et al. | 260/78.5 |

Primary Examiner—Lewis T. Jacobs

[57] ABSTRACT

A method of preparing ammonium salts of resinous polycarboxylic acid in substantially anhydrous form is disclosed. Improved aqueous textile printing compositions are prepared using the ammoniated resins as thickeners.

10 Claims, No Drawings

AMMONIUM SALTS OF RESINOUS POLYCARBOXYLIC ACIDS

This application is a continuation-in-part of our copending application Ser. No. 409,482 filed Oct. 25, 1973, now abandoned.

This invention relates to the preparation of ammonium salts of polycarboxylic acids, especially those ammonium salts which are useful as thickeners of aqueous compositions such as textile decorating compositions. The invention also relates to improved compositions for use in decorating textiles.

In the textile printing field wherein colorants are printed on textile fabrics, the colorant has to be dispersed, or dissolved if it is a dye, in a carrier vehicle which is of such consistency that can be printed by conventional textile printing techniques, e.g., using intaglio printing cylinders or screen printing.

When using aqueous carrier or printing vehicles, it is necessary to thicken the aqueous compositions with water thickeners. Ammonium salts of resinous polycarboxylic acids are commonly used as thickeners in aqueous textile printing compositions. In accordance with prior art practice, a concentrate is prepared using water, ammoniated or non-ammoniated thickeners, binders, emulsifiers and any other ingredients necessary for specific properties. The prior art techniques have led to troublesome problems due to the presence of water. For example, some thickeners exhibit hydrolytic instability on ageing which results in a gradual loss of thickening efficiency. Other thickeners are extremely difficult to process in the presence of water and in some instances necessitate a multiple package product. These problems present added cost to the textile printer. Aqueous carrier or printing vehicle as the term is used in the textile printing field includes emulsion carriers or vehicles wherein an aqueous phase is the continuous phase. Water thickeners are used in the aqueous phase of such vehicles.

One of the main objects of the present invention is to overcome the above disadvantages in the use of ammonium salts of resinous polycarboxylic acids as thickeners. Other objects of the invention are: to provide an improved method of preparing ammonium salts of resinous polycarboxylic acids, to provide an improved clear concentrate, to provide improved clear extender textile printing vehicles, and to provide improved textile printing pastes containing a thickened aqueous phase. Other objects will be obvious from the following detailed description of the invention.

An important aspect of the invention is the preparation of the ammoniated thickener, i.e., the ammonium salt of the resinous polycarboxylic acid. The ammonium salt must be prepared under substantially anhydrous conditions. The preparation of the ammonium salt is carried out by reacting nascent ammonia with solid particles of the resinous polycarboxylic acid dispersed in an inert, substantially anhydrous, organic liquid. By substantially anhydrous, it is meant that the final product will not contain more than about 3.5% water. Advantageously, the nascent ammonia is produced in situ in the reaction mixture by the decomposition of ammonium bicarbonate or ammonium carbonate. Ammonium carbonate is preferred. The appropriate inert organic liquid will generally be selected having in mind the particular end use of the product. For instance, if the ammonium salt of the resinous polycarboxylic acid is to be used as a thickener in an aqueous textile printing composition, it is essential that the organic liquid be compatible with at least some of the other ingredients of the print paste; preferably the organic liquid would serve a further useful purpose either for improved final properties or as a processing aid. The organic liquid preferably is a non-volatile liquid, a plasticizer, a dispersing agent or a surfactant. Volatile liquids are less preferred because they become air pollutants when they are evaporated.

Polycarboxylic acid, as used herein, is intended to cover the anhydrides of polycarboxylic acids as well as the free acid form of the acids.

In the preparation of the ammonium salt in accordance with the invention, it has been found that solid reactants, i.e., the resinous polycarboxylic acid and the ammonium carbonate, must be in finely divided state. The reactants may be converted to finely divided form during the reaction, i.e., in the reaction vessel. For example, the reaction may be carried in grinding or dispersing apparatus, such as a ball mill, wherein the reactants are converted to finely divided form in the reaction mixture. If the reactants are previously ground to fine particle size before commencing the reaction, they are preferably ground, or pulverized separately until they are of such fineness that no more than 5% by weight will be retained on a 60 mesh sieve or screen. If the particles are larger, complete conversion of the polycarboxylic acid to the ammonium salt is not achieved within a commercially acceptable time period. The reaction between the resinous polycarboxylic acid and nascent ammonia can be carried out at room temperature but preferably is carried out at elevated temperatures, preferably on the order of 50°C. to 80°C., to speed up the reaction. The reaction is carried out in a reaction container equipped with suitable agitation to ensure adequate mixing of the reactants. Advantageously, the reaction is carried out in conventional mixing, or dispersing, apparatus which is equipped with means for heating the reactants, e.g., ball mill, mixing tank, Day-Nauta mixer, etc.

When ammonia is generated in situ from ammonium carbonate, water and carbon dioxide will be produced in accordance with the following reaction:

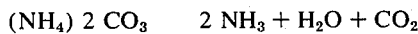

$(NH_4)_2 CO_3 \quad 2 NH_3 + H_2O + CO_2$

The reaction between the carboxylic acid group of the resin and ammonia produces the ammonium salt. If the reaction is between an anhydride group and ammonia, some amide formation will occur along with the ammonium salt.

The water produced by the decompositions of the ammonium carbonate is not detrimental to the process for preparing the ammonium salts and the requirement that the reaction be carried out under substantially anhydrous conditions does not exclude the presence of such water produced during the reaction. The amount of water produced by decomposition of the ammonium carbonate is relatively small and generally amounts to no more than about 3.5% by weight of the final product, and is usually less. Such amounts of water do not have an adverse effect on the process.

Resinous polycarboxylic acids which are operable in the invention include those having an acid number of 100 to 1,000 and a viscosity of at least 100 poises as measured on a 1% solution in aqueous ammonia at a pH of about 9 and a temperature of 25° C. those having a viscosity of 200 poises, or higher, are preferred because of their greater efficiency as thickeners.

Among the resinous polycarboxylic acids that are included in the above definition are the synethtic water soluble carboxyvinyl polymers such as Carbopol 934 which is a cross-linked polymer of acrylic acid wherein the cross-linking agent is 0.75 to 2% by weight of polyallyl sucrose containing 5.6 to 5.8 allyl groups per molecule. Other carboxyvinyl polymers of this type are polymers and copolymers of acrylic acid, methacrylic acid, maleic anhydride, or in general, α,β-unsaturated acids and the anhydrides, with other hydrophilic monomers such as the lower alkyl vinyl ethers, or up to equimolar amounts of hydrophobic monomers such as vinyl monomers and acrylic monomers. Further prior art descriptions of this type of carboxylvinyl polymer may be found in U.S. Pat. Nos. 2,798,053; 2,909,462; 3,314,857; 3,346,449; 3,379,554; and 3,592,936. These carboxyvinyl polymers are available in powder form from Goodrich Chemical Company.

Another group of resinous polycarboxylic acids that are operable in the invention include the copolymers of ethylene and maleic anhydride, which may be cross-linked to varying degrees. Such thickeners are available commercially as EMA-71, EMA-91, etc., from Monsanto Chemical Company.

Still another type of suitable thickener includes the alkali soluble interpolymers of methacrylic acid, butadiene, styrene and a half ester of maleic anhydride and a dinonyphenoxypoly (ethyleneoxy) ethanol which are described in U.S. Pat. No. 3,657,175. Such thickeners are available in powder form from Standard Brands Chemical Industries, Inc. under the trade name "Tychem."

A preferred embodiment of the invention comprises the preparation of ammoniated thickeners in substantially anhydrous form. In preparing the thickeners of the present invention, it is preferable to react the resinous polycarboxylic acid and ammonia in substantially stoichiometric ratio; however, an excess of either reactant may be used without departing from the invention. Up to 10% excess of ammonia reactant has been used with very satisfactory results and, in fact, may be desirable if small amounts of ammonia escape during the reaction.

Another preferred embodiment of the invention comprises a clear concentrated dispersion of the ammoniated thickener in the organic liquid used in the preparation of the thickener. Such dispersion will generally contain other additives that were added during or after the ammoniation reaction. Such additives may include conventional additives used in textile printing pastes such as dispersing agents, binder resins, plasticizers, low crock additives, migration control agents, volatile organic solvents, etc.

Usually such concentrates for use in preparing pigmented textile printing pastes will contain 10 to 30% by weight of the ammoniated thickener (calculated as the free acid) and 40 to 80% by weight of the inert organic liquid. Other additives include 3 to 5% by weight of water soluble aminoplast binder resin, especially hexamethoxymethyl melamine, low crock additives, migration control agents, etc.

Still other embodiments of the invention comprise concentrated pigmented printing pastes wherein the concentrated dispersions of the ammoniated thickener are used in formulating the printing paste. In general, such printing pastes would be made by preparing a "cut clear" from the clear concentrate dispersion.

The concentrate is dispersed in water until maximum thickening is obtained. When an emulsion is desired, organic solvent such as Varsol or mineral spirits may be emulsified into the aqueous phase. This cut clear is then used as a carrier for the pigment dispersion. Additions of low-crock additives, such as latex, may be made as desired to obtain the desired level of crockfastness in the final print paste. Rubber latices and the lubricant type anti-crock agents, especially the polyalkyl polysiloxanes, disclosed in U.S. Pat. No. 3,223,663 are the preferred low-crock additives used in the present invention.

The following examples in which the parts are by weight are given to further illustrate the invention.

EXAMPLE 1

| | Parts |
|---|---|
| Tychem 9520 (Acid No. 267, viscosity 220 poises as measured on a 1% ammoniacal solution at 25°C. and pH of 9) | 4.5 |
| EMA-91 (Acid No. 888, viscosity 335 poises as measured on a 1% ammoniacal solution at 25°C. and pH of 9) | 9.1 |
| Ammonium carbonate | 13.6 |
| Kodaflex 864 (polymeric polyester type plasticizer having a Brookfield viscosity of 50 poises, at 25°C., at 25 RPM and No. 6 spindle) | 44.7 |
| Chemacoil TA 100 (vinyloxazoline ester, prepared from Tris (hydroxymethyl) amino methane, tall oil fatty acids, and formaldehyde) | 3.0 |
| Triton X100 (octyl phenoxypolyethoxyethanol) | 12.0 |
| Span 80 (sorbitan mono-oleate) | 9.6 |
| Silicone Oil 200 (a polyalkylpolysiloxane) | 3.5 |

Tychem 9520, EMA-91, and ammonium carbonate, each of a particle size such that at least 95% by weight passed a 60 mesh screen, were mixed with the Kodaflex 864, Chemacoil TA100, Triton X-100 and Span 80 in a Day-Nauta Mixer, then heated to 75°C. for 30 minutes. The Silicone Oil was then added and the temperature allowed to drop to ambient temperature. The resulting substantially anhydrous composition was used as a concentrate for the preparation of aqueous textile printing clears, or carriers, for printing on textiles. A typical cut clear was made by mixing 4.5 parts of the above concentrate with 95.5 parts of water on a high speed mixer, e.g., an Eppenbach Mixer. The cut clear, or carrier, is then mixed with the desired color concentrate and other additives to obtain a print paste. A typical print paste would consist of

| | Parts |
|---|---|
| Cut Clear | 80 |
| Color Concentrate | 10 |
| Butadiene-Acrylonitrile Latex, 35 to 45% Solids (low crock additive) | 10 |

The print paste is mixed on a high speed mixer until uniform. The color concentrate composition is not critical and can be any of a variety of aqueous pigment dispersions. A typical color concentrate consists of 21.4% organic pigment (e.g., phthalocyanine blue), 6.4% polymeric anionic dispersant (e.g., the half benzyl ester of ethylene-maleic anhydride copolymer), 0.5% ammonium oleate, 1.5% fungicide (e.g., Dioxin), 0.25% thickener (e.g., Acrysol ASE-60), and 69.95% water. Use of 10% of such a color dispersion in the print paste would provide medium blue prints when printed on textiles.

EXAMPLE 2

| | Parts |
|---|---|
| Tychem 9520/Ammonium carbonate, 50/50 mixture, ball milled overnight at room temperature | 8.95 |
| EMA 91/Ammonium carbonate, 50/50 mixture, ball milled overnight at room temperature | 18.09 |
| Kodaflex 864 | 47.81 |
| Chemacoil TA100 | 2.98 |
| Triton X100 | 11.93 |
| Span 80 | 9.54 |
| Polyalkylpolysiloxane | .70 |

All of the above ingredients except the polyalkyl polysiloxane were mixed in a ball mill at 75°C. for 30 minutes, then the polyalkyl polysiloxane was added and the mixture was allowed to cool to ambient temperature.

Cut clear printing vehicles and printing pastes can be made as in Example 1 for printing on textiles.

EXAMPLE 3

| | Parts |
|---|---|
| EMA-91 (as in Example 1) | 9.1 |
| Tychem 9520 (as in Example 1) | 4.5 |
| Ammonium carbonate | 13.6 |
| Kodaflex 864 | 47.5 |
| Chemacoil TA100 | 3.0 |
| Triton X-100 | 12.0 |
| Span 80 | 9.6 |
| Hodag FD-82 (polysiloxane oil) | 0.7 |

The first three ingredients, each of a particle size such that at least 95% by weight passed a 60 mesh screen, were mixed with the Kodaflex 864, Chemacoil TA100, Triton X-100 and Span 80 in a Day-Nauta Mixer, then heated at 75°C. for 30 minutes. The Hodag FD-82 was then added and the temperature allowed to drop to ambient temperature. The resulting substantially anhydrous composition was used for the preparation of textile printing pastes in a manner similar to the composition of Example 1.

EXAMPLE 4

| | Parts |
|---|---|
| Carbopol 934 (Acid No. 747, viscosity too high to measure on a 1% ammoniacal solution at pH of 9) | 22.2 |
| Ammonium carbonate | 22.3 |
| Sorbitan mono-oleate | 1.1 |
| Chemacoil TA-100 | 44.4 |
| Triton X-100 | 1.1 |
| Hexamethoxymethyl melamine | 6.7 |
| Methyl cellulose 4000 cps. | 2.2 |

The ammonium carbonate and Carbopol 934, both of such particle size that at least 95% by weight passed a 60 mesh screen, were mixed with sorbitan monooleate, Triton X-100 and Chemacoil TA-100 in a Day-Nauta Mixer for 3 hours at 75°C., then cooled to 50°C. and the hexamethoxymethyl melamine and methyl cellulose were added and the mixture allowed to cool to ambient temperature. The resulting substantially anhydrous composition was useful as a clear concentrate for the preparation of aqueous textile printing compositions as in Example 1.

EXAMPLE 5

In a manner similar to that of Example 4, a substantially anhydrous composition useful as a clear concentrate for the preparation of aqueous textile printing composition was prepared from:

| | Parts |
|---|---|
| Tychem 9520 | 22.9 |
| Ammonium carbonate | 22.9 |
| Sorbitan mono-oleate | 3.4 |
| Chemacoil TA-100 | 3.7 |
| Triton X-100 | 19.6 |
| Hexamethoxymethyl melamine | 4.5 |
| Kodaflex 864 | 23.0 |

EXAMPLE 6

| | Parts |
|---|---|
| Amsco Odorless 450 Solvent (aliphatic hydrocarbon, boiling range 378° to 460°F., KB 25.2) | 40.4 |
| Plasticizer (Kodaflex 864) | 9.0 |
| Armid O (Amide of oleic acid) | 2.3 |
| Triton X-100 | 1.0 |
| EMA-91 | 23.2 |
| Ammonium Carbonate | 21.2 |
| Sodium lauryl sulfate | 2.9 |

The EMA-91 and ammonium carbonate were separately micropulverized to a particle size such that at least 95% by weight passed a 60 mesh screen. The micropulverized materials were mixed with the remaining ingredients, except sodium lauryl sulfate, in a Day-Nauta Mixer for 3 hours at 80°C. then the sodium lauryl sulfate was added and the mixture cooled to room temperature. The resulting substantially anhydrous composition was useful as a clear concentrate for the preparation of aqueous textile printing compositions as in Example 1.

What is claimed is:

1. A method of preparing ammonium salts of resinous polycarboxylic acids which comprises reacting the said polycarboxylic acid, in particulate form, with nascent ammonium generated in situ from particles of an ammonium coumpound of the group consisting of ammonium carbonate and ammonium bicarbonate, said reaction being carried out under substantially anhydrous conditions in an inert organic liquid between said particles of polycarboxylic acid and said particles of ammonium compound of such size that at least 95% by weight pass through a 60 mesh screen.

2. A method as in claim 1 wherein resinous polycarboxylic acid has an acid number of from 100 to 1,000 and a viscosity of at least 100 poises measured on a 1% aqueous ammoniacal solution at 25°C. and a pH of 9.

3. A method as in claim 2 wherein the resinous polycarboxylic acid is a carboxyvinyl polymer.

4. A method as in claim 2 wherein the resinous polycarboxylic acid is a copolymer of ethylene and maleic anhydride.

5. A method as in claim 2 wherein the resinous polycarboxylic acid is a member of the group consisting of interpolymers of a half ester of maleic anhydride and a dinonylphenoxypoly (ethyleneoxy) ethanol.

6. A clear concentrate suitable for use in preparing aqueous textile printing compositions, said concentrate containing A. 10 to 30% by weight of ammoniated thickener prepared by reacting resinous polycarboxylic acid, in particulate form, with nascent ammonia generated in situ from particles of an ammonium compound of the group consisting of ammonium carbonate and ammonium bicarbonate, said reaction being carried under substantially anhydrous conditions in an inert organic liquid between said particles of polycarboxylic and said particles of ammonium compound of such size that at least 95% by weight pass through a 60 mesh screen and B. 40 to 80% by weight of an inert organic liquid.

7. A clear concentrate as in claim 6 which contains 3 to 5% by weight of water soluble aminoplast resin.

8. A clear concentrate as in claim 6 which contains 3 to 5% by weight of a low crock additive.

9. A clear concentrate as in claim 6 which contains 3 to 5% by weight of a migration control agent.

10. A clear concentrate as in claim 6 wherein the resinous carboxylic acid has a viscosity of at least 200 poises measured on a 1% aqueous ammoniacal solution at 25°C. and pH 9.

* * * * *